INVENTORS:
MORRIS LEVIN
RAYMOND A. STAHL
BY Howson & Howson
ATTYS.

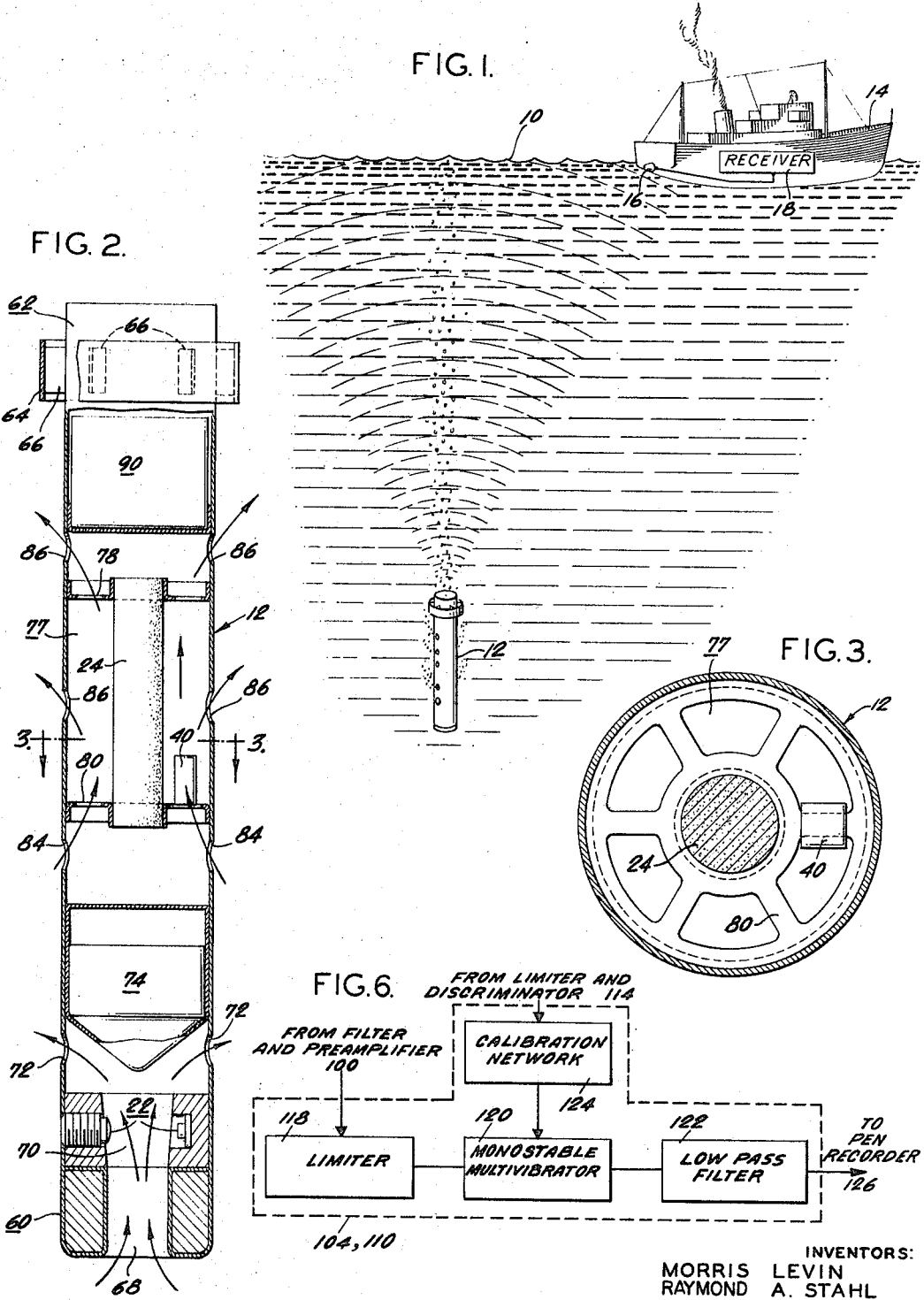

United States Patent Office 3,341,808
Patented Sept. 12, 1967

3,341,808
TELEMETERING APPARATUS
Morris Levin, Abington, and Raymond A. Stahl, Roslyn, Pa., assignors to American Bosch Arma Corporation, Philadelphia, Pa., a corporation of New York
Filed Oct. 12, 1965, Ser. No. 495,183
18 Claims. (Cl. 340—5)

ABSTRACT OF THE DISCLOSURE

Telemetering apparatus is disclosed having a transmitter system with means for measuring the velocity of acoustical waves in water and for generating an electrical signal at a frequency indicative of the velocity. A fixed-frequency signal generator is provided having an output signal of known frequency. An amplitude modulator is responsive to the velocity indicating signal and fixed-frequency signal to produce an amplitude-modulated electrical signal. An electro-acoustical transducer is supplied with the modulated signal for transmitting an acoustical signal corresponding thereto. A receiver system is disclosed to pickup and convert the acoustical signal transmitted from the transmitter system. The receiver system converts the received signal into its components for providing the velocity of acoustical wave information and the fixed-frequency signal, which is used to correct the velocity of acoustical wave information for any error due to doppler. A housing is provided to give a constant rate of sinking to the transmitter system and pressure-sensitive means is provided in the housing to give indication when a predetermined pressure of the water occurs.

---

The present invention relates to an apparatus for measuring and telemetering indications of velocity of acoustical waves in a medium, and more particularly, to apparatus for transmitting an acoustical signal in water providing an indication of the measurement of the velocity of acoustical waves at different depths in water and providing a fixed-frequency signal for comparison and correction of the velocity of acoustical wave information for doppler effect of the acoustical signal in traveling to a receiver.

In recent years there has been great interest in accurately determining the vertical profile of velocity of sound in the ocean from the surface to great depths. Knowledge of the profile of the ocean is useful in oceanographic studies to determine the current flow at depths in the ocean and is especially useful in connection with operation of sonar equipment for the reason that a layer of water having a markedly different density will produce strong refraction of sonar waves impinging thereon, thereby preventing or distorting detection of objects located in such layers, such as submarines. These layers can be detected by means of apparatus which is capable of measuring the velocity of acoustical waves at various depths beneath the surface of the water. Such an apparatus for measuring the velocity of acoustical waves is described in a pending application entitled "Apparatus for Measuring the Velocity of Acoustical Waves," Ser. No. 386,890, filed Aug. 3, 1964, by William C. Parenti, of common assignee herewith and now Patent No. 3,273,111, issued Sept. 13, 1966. The apparatus described in that patent may be, and preferably is, employed in the system of the present invention. The present invention does not require changes in the apparatus for measuring the velocity of acoustical waves but rather a change in other apparatus of the system which must be used with the measuring apparatus in transmitting the information by a sonic link to a receiving station.

In such systems for obtaining the vertical profile of sound in water versus depth from the surface, it is desirable to make measurements over many different areas in order to detect radical changes in the vertical profile caused by different density layers occurring at varying depths from the surface of the ocean. Due to the many locations desired to be checked, it is desirable to provide a system which is expendible thereby not requiring retrieval from, for example, depths of 6,000 feet below sea level. It is also desirable in such a system to employ sonic wave telemetering of information rather than employing a cable or wire link to a receiving station, as the wire link causes variations in free fall of the system. In addition, it is desirable to have such a system that provides substantially continuous information as to the velocity of sound in water versus depth so that radical changes in the vertical profile of the water will be detected rather than completely missed or distorted by a system intermittently transmitting such information.

In the prior art, systems have been designed to determine the vertical profile of the ocean at various depth from the surface thereof. Some of these systems have employed wireless telemetering of information from the sinking system through the water to a receiving station generally located aboard a ship, the information being picked up by a hydrophone carried by the ship in the water. Such wireless systems have generally measured pressure of the surrounding water versus depth, or temperature of the water versus depth, in order to obtain an indication for prediction of probable distribution of sonar waves used in the detection of and search for submarines or the like. These systems measuring temperature or pressure generally employ a sensor which determines the average effect of pressure or temperature and the information is converted to telemetered acoustical signals to provide an indication thereof. This telemetered information is picked up and converted by use of empirical tables to give indications of the probable velocity of acoustical waves in the water. Of course, inherent limitation of the averaging operation inherent in the sensor might result in missing a radical change in the data and in averaging out peaks and troughs which otherwise might have been detected if continuous information as to velocity of acoustical waves were provided. In addition, in order to correct for doppler effect of the moving system sinking through the water and the moving receiving station, the prior art systems provide a fixed-frequency signal telemetered on a time-sharing basis with the other information. These temperature and pressure sensing anad telemetering systems not only average out the measured information by the action of the sensor, but introduce further inaccuracies in the information through the time-sharing type of sonar transmission, thereby giving point-to-point information rather than continuous information. In addition, with the time-sharing fixed-frequency signal for doppler effect correction, the corrections may not be entirely accurate due to the averaging effect of the telemetered signal. Therefore, it would be desirable to have not only continuous information as to the velocity of acoustical waves in the water but also continuous information as to doppler effect for correction of the velocity of acoustical wave information.

Accordingly, it is an object of the present invention to provide a new and useful apparatus for telemetering accurate information as to velocity of acoustical waves in water.

Another object is to provide apparatus which is capable of transmitting sonic waves to give continuous information of velocity of acoustical waves in water and to simultaneously provide continuous information of doppler effect for comparison and correction of the velocity of acoustical wave information.

It is also an object to provide such apparatus which is compact and inexpensive to manufacture.

Still another object is to provide such apparatus which is especially adapted for a constant non-turbulent descent through the water.

A further object is to provide a new and improved receiver system for converting the received signal to desired information.

An additional object is to provide a transmitter and receiver system which will increase the accuracy and reduce the cost of a system for providing information of the velocity of acoustical waves at different depths in water.

Still a further object is to provide a telemetering system for transmitting an acoustical signal which provides, first, a substantially continuous indication of the velocity of acoustical waves at different depths in the water; second, a substantially continuous fixed-frequency signal for comparison and correction of the velocity of acoustical wave information for doppler effect; and, third, a signal in the form of a momentary interruption of the acoustical signal indicative of the time which a predetermined depth of the system occurs.

In accordance with the present invention, these and other objectives are achieved by providing a new and improved telemetering system with novel features which cooperate to accomplish the objectives. The present invention employs means for measuring the velocity of acoustical waves in a medium, which for purposes of illustration will be considered water, and for producing a series of output signals at a frequency indicative of the velocity of acoustical waves in the water. A fixed-frequency generator is employed having an output signal of known frequency. Also employed is an amplitude modulator which is responsive to the velocity-indicating output signal and the fixed-frequency output signal to modulate the amplitude of the output signal at the rate of the fixed-frequency output signal. The resulting modulated output signal is supplied to transducer means which is responsive to the modulated signal to transmit it into the water as an acoustical signal, whereby the carrier frequency of the acoustical signal provides a continuous indication of the velocity of acoustical waves in the water and the modulation frequency thereof provides a continuous fixed-frequency signal to correct the velocity information for Doppler effect encountered by the acoustical signal in traveling to a receiver. Since the velocity-indicating output signal and the fixed-frequency signal modulated thereon travel together along the same paths to the receiving station, both signals are affected by the same by Doppler effect so that the known fixed-frequency signal provides an accurate source of correction for the velocity of acoustical wave information.

In accordance with a further feature of the invention, a pressure-sensing means is provided which is responsive to a predetermined pressure of water for triggering the system to interrupt operation of the amplitude modulator and to provide an indication of the time at which the predetermined pressure occurs. More particularly, according to the present invention in a preferred form, the pressure sensing means comprises a pressure-sensitive switch actuatable to complete an electrical path at a predetermined pressure of water. A keyer is employed which is responsive to the completion of the electrical path for actuating the system momentarily to interrupt transmission of the acoustical signal from the transducer means at least once, thereby providing an indication of the time at which the predetermined pressure occurs.

In accordance with still a further feature of the invention in a preferred form, provision is made to provide a constant rate of sinking of the system for a stable and non-turbulent descent so that an accurate vertical profile of the ocean may be obtained.

Another feature of the present invention is the receiver system used to pickup and convert the acoustical signal transmitted from the transmitter system. The receiver system converts the received signal into its component parts to give the velocity of acoustical wave information and fixed-frequency signal, which is used to correct the velocity of acoustical wave information for any error due to Doppler effect.

For a better understanding of the present invention, reference is made to the following drawings, wherein:

FIG. 1 is a schematic representation illustrating an overall system in use, in accordance with a preferred form of the present invention;

FIG. 2 is a side elevational view, partially in section, of the housing structure of the present invention;

FIG. 3 is a sectional view taken along line 3—3 of FIG. 2;

FIG. 6 is a block diagram illustrating one form of apparatus suitable for use as the limiter and frequency discriminator and signal combiner of FIG. 5.

Figure 5:
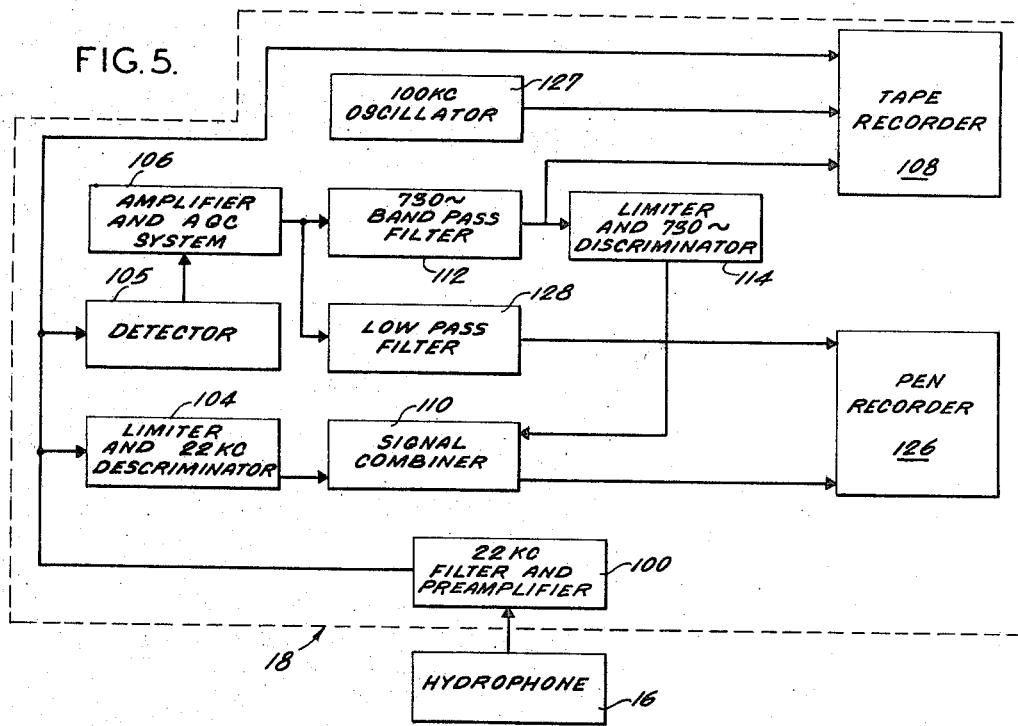
FIG. 5 is a block diagram illustrating one form of apparatus suitable for use as a receiving system for the acoustical signal transmitted from the housing structure.

Referring now to the embodiment of the invention illustrated in FIG. 1, this embodiment is intended to generate and transmit sonic waves below the surface of body of water 10, and in this example it will be assumed that the water is salt water. The entire generator and transmitter system consists of a housing generally designated 12 and apparatus contained therein. Housing 12 is designed to be dropped into the water as from a ship generally designated 14 or from an airplane or the like. The acoustical signal transmitted from the housing within the water is picked up by a receiving hydrophone 16 which may be towed behind the ship and electrically connected to the receiver generally designated 18 for converting the received signal to desired information on board the ship.

Figure 4:
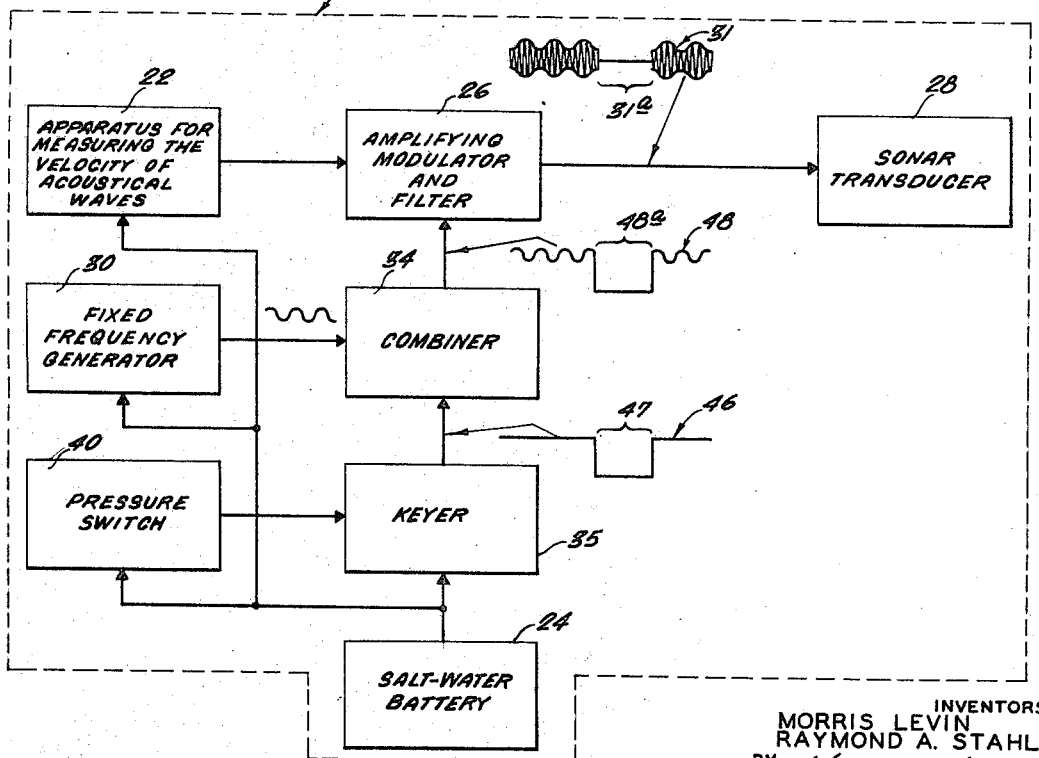
FIG. 4 is a block diagram illustrating the signal generating and transmitting system contained in the housing structure of the present invention.

The block diagram of FIG. 4 illustrates the generating and transmitting system 20 of the present invention, which is contained in the housing 12. This system comprises an apparatus 22 for measuring the velocity of acoustical waves in the housing, which apparatus contains an electro-acoustical transducer and pulse generating means preferably as described in the above-cited patent application of Parenti. The output of the apparatus 22 provides a signal comprising a series of pulses, the frequency of which is indicative of the velocity of acoustical waves in the water in the housing 12 as the housing sinks through the water. More specifically, the frequency of recurrence of the pulses is proportional to the velocity of the acoustical waves in the water at the particular depth of the housing at that instant. From a knowledge of this pulse recurrence frequency, the velocity of the acoustical waves through the water can be calculated. The power to operate the apparatus 22 for measuring the velocity of acoustical waves and for operating the entire system is provided by a sea water battery 24.

The output pulses from the apparatus 22 for monitoring the velocity of acoustical energy are in the general form of a square-wave signal and are supplied to an amplifying modulator and filter designated 26. The output pulses of the apparatus 22 in one embodiment were of a frequency of approximately 22 kilocycles and the filter portion of amplifying modulator and filter 26 was a 22 kilocycle bandpass filter effective to convert the output pulses to a 22 kilocycle sine wave signal. The amplifying modulator portion of amplifying modulator and filter 26 may comprise a conventional transistorized power amplifier selected to act as a modulator, as will be explained hereinafter.

The amplified sine wave output signal of the amplifying modulator and filter, representative of the velocity of acoustical energy in the water, is supplied to and used to drive a sonar transducer 28 which launches acoustical output waves into the salt water. The sonar transducer is of the type to provide good acoustical coupling between the transducer and salt water, preferably comprising a piezoelectric polycrystalline crystal such as barium titanate. The parameters of the sonar transducer are preferably of a character to cause the transducer to act as a filter which further shapes the velocity of acoustical energy signal into the form of a sine wave and rejects extraneous unwanted signals. In some instances of use of the present invention, the filter may be eliminated from the amplifying modulator and filter and only the filtering action of the resonant sonar transducer employed.

In accordance with the preferred use of the present system, with the housing sinking through the water and the receiving station located on a moving ship, doppler effect acting on the signal between the housing and the ship will limit the accuracy of the system. In such an arrangement, the doppler effect is complicated by the refraction caused by the variation in the index of refraction of the water medium, such that simple constants determined from the rate of sinking of the housing and the speed of the ship may not be themselves adequate for the substantial correction of Doppler error. In accordance with the present invention, doppler effect correction is accomplished by employing a fixed-frequency generator 30 having an output signal of known frequency. The fixed-frequency generator may be provided by a conventional tuning-fork oscillator, crystal-controlled oscillator or other stable oscillator to provide a constant frequency and amplitude of output, power being supplied to the fixed-frequency generator by sea water battery 24. The frequency of the fixed-frequency generator is chosen to be sufficiently lower than the frequency of the velocity of acoustical waves that the signals may be sent out together without interference, as by the fixed-frequency signal providing amplitude modulation of the velocity of acoustical energy signal.

To give an illustration of the frequencies at which the system may operate, in one embodiment of the invention the apparatus for measuring the velocity of acoustical waves generates a frequency of approximately 22 kilocycles, as previously stated, and the fixed-frequency generator may operate at a frequency on the order of 730 cycles. The salt-water activated battery used to provide power to the system may produce a direct voltage on the order of 28 volts.

More particularly, the output of the fixed-frequency generator 30 is supplied to a modulating input terminal of amplifying modulator and filter 26 to produce amplitude modulation of the velocity of acoustical waves signal from the apparatus 22 whose output signal serves as the carrier. Amplifying modulator and filter 26 includes a bandpass filter having a passband to accommodate the carrier frequency and its modulation sidebands, e.g., in the example 22 kilocycles±730 cycles. Because of this the high frequency components of the pulses from apparatus 22 are rejected and only a sinusoidal component at the fundamental frequency of 22 kilocycles of the velocity of acoustical waves signal appears at the output of amplifying modulator and filter 26, as shown in the waveform at 31 of FIG. 4. It is noted that the latter waveform contains an interruption 31a, which as will become apparent, indicates the time at which the housing 12 reaches a predetermined depth. This interruption is produced in this example by interrupting the operating supply voltage for the amplifying modulator and filter 26 when the predetermined depth is reached.

In the example shown, the fixed-frequency signal from generator 30 is supplied to amplifying modulator and filter 26 by way of combiner 34, and the operating supply voltage is supplied from battery 24 to amplifying modulater and filter 26 by way of keyer 35 and the combiner 34. The combiner 34 may, for example, comprise a transformer having a secondary through which the direct voltage of 28 volts is supplied to the amplifying modulator and filter 26 and a primary to which the 730-cycle output of generator 30 is applied. Accordingly, when keyer 35 is in its normal state, the operating supply voltage and the fixed-frequency signal are both applied to amplifying modulator and filter 26 to produce the above-described amplitude modulation output signal. However, keyer 35 is momentarily actuated to a substantially open-circuit condition upon attainment of a predetermined depth by housing 12, as will be described more fully hereinafter. When this occurs, operating supply voltage is removed from amplifying modulator and filter 26 and the interruption 31a in the output signal is produced. When a combiner of the transformer type mentioned above is used, the fixed-frequency signal reaching amplifying modulator and filter 26 is also reduced substantially to zero.

The 22 kilocycle carrier frequency output of the amplifying modulator and filter 26 provides a continuous indication of the velocity of acoustical waves in housing 12 the 730 cycle modulation thereof providing a continuous fixed-frequency reference signal for doppler correction purposes. This output signal from the amplifying modulator and filter 26 is launched into the water by the sonar transducer 28 for transmission to the receiving station.

In accordance with a further feature in the preferred embodiment of the invention, the arrangement for providing information as to the depth-versus-time descent of the housing 12 is provided in the transmitted acoustical signals as follows. It has been determined that a one-point time-depth reference in the free fall of the housing is sufficient to provide a correction factor to compute the rate of fall at which the housing is sinking through the water, thereby providing the information as to the depth at which the velocity of acoustical information at any time is measured. The depth information signal is produced by employing a conventional pressure switch 40 which may be actuated, for example, at the pressure occurring at 1500 feet of sea water. This point at which the pressure switch is actuated provides a correction factor for, or a verification of, the rate of fall of the housing theoretically calculated. With this one point of reference as to depth, and knowing the time at which this depth is reached, the rate-of-fall curve on which the one-point time-depth reference falls may be determined.

The closure of pressure switch 40 actuates momentarily the keyer 35, which is connected between the sea water battery 24 and combiner 34. This keyer provides a low resistance path between the battery and the combiner, except for the brief interval when it is switched or triggered to a high resistance state in response to closure of the pressure switch. The function of the keyer can be performed by any one of a variety of electronic switches, and, in one instance, may be provided by a transistor having its emitter connected to the battery, its collector connected to the combiner, and its base connected to the pressure switch through a capacitor such that closure of the pressure switch changes the transistor from its conductive to its non-conductive state while the capacitor charges in response to the closure of the switch. After the capacitor has charged fully, the transistor will return to its conductive state and provide a low resistance electrical path between the battery and the combiner. By this arrangement the keyer 35 operates for a limited time to interrupt supply of voltage from the sea water battery 24 to combiner 34 and thereby interrupts the supplying of operating power to the amplifying modulator and filter 26 and interrupts the output signal of the system. This interruption of the output signal gives indication of the time at which the housing reaches the predetermined depth for which the pressure switch 40 is actuated. The output voltage from the keyer 35 to the combiner 34 has a waveform similar to that shown at 46, the keyer producing a short-duration pulse 47 to interrupt the supply of voltage from the battery to the combiner.

The keyer 35 can if desired constitute a more complex circuit arrangement for generating a code, such as two pulses, to provide greater assurance in the presence of noise that a given interruption in the output signal detected at the receiver is caused by the keyer and not by interference. Such a two-pulse generator could constitute a single flip-flop circuit of a form known to those skilled in the art. However, since the approximate time at which the housing will have descended to a depth of 1500 feet is known, a coded interruption transmitted at that time is under most circumstances not necessary for reliable detection of the transmitted interruption.

The output signal from the combiner 34, which comprises a direct voltage component from the battery combined with the fixed-frequency signal of the generator 30, has a voltage waveform similar to that shown at 48. In the waveform shown a 48, the interruption 48a shown therein during which the voltage is at a value of zero volts is the result of the pressure switch and keyer providing the interruption to indicate the time-depth reference position of the housing at the predetermined depth.

The output signal from the amplifying modulator and filter 26 supplied to the sonar transducer has a voltage waveform similar to that shown at 31, as previously stated. The latter waveform shown comprises a carrier wave having a frequency indicative of the velocity of acoustical waves which is amplitude-modulated by the fixed-frequency signal from generator 30 and with the interruption indicating the time-depth reference point at which the pressure switch closed. The signal from the amplifying modulator and filter is sufficient to drive the sonar transducer 28 so as to launch acoustical signals into the water and transmit them through the water to the receiving station.

Referring now to FIG. 2, the housing 12 shown therein contains the overall system of FIG. 4. The housing is somewhat similar to a sonobuoy and comprises a cast-iron structure which is inexpensive to manufacture and yet provides the necessary weight to cause the housing to sink at a generally uniform rate to depths such as 6000 feet. In the preferred form, the housing is cylindrical having dimensions on the order of 3 inches in diameter and 20 inches in length. One end of the housing, hereinafter referred to as nose portion 60 which leads the housing through the water, comprises a weighted and blunt-ended portion to assure a downward and constant rate of sinking of the housing. Adjacent the other end, generally designated 62, of the housing a fin 64, which is annular in form, is fixed to and encircles a portion of the housing. The fin is made of a sheet of metal with its largest cross-sectional dimension being coaxial with the housing and is supported at a distance from the housing by radially extending support members 66 connected between the periphery of the housing and the inner surface of the fin. The fin provides a relative large surface area but does not greatly increase the overall diameter of the housing. This arrangement of the fin allows water to flow between the fin and the housing with the fin presenting a knife-like edge as the housing sinks through the water. In this manner, the fin provides stability to the housing as it sinks through the water for a constant and non-turbulent descent thereof.

The blunt-ended nose portion 60 of the housing has an axial bore 68 extending the length thereof to permit water to flow into chamber 70 in the housing, the water being exhausted through outlet ports 72 located around the periphery of the housing. Ports 72 communicate with and are located above chamber 70 in the housing. The apparatus 22 for measuring the velocity of acoustical waves is preferably located in chamber 70 and provides indication of the velocity of acoustical waves in the water as the housing descends. The apparatus 22 comprises an electro-acoustical transducer and pulse generating means as described in the above-cited application of Parenti. The pulse-generating means, transducer and transmitting and receiving circuits as described in the above-cited application are located in a water-tight chassis generally designated 74 fixedly supported in the housing above the water outlet ports 72.

Supported centrally in the housing in a chamber 77 above chassis 74 is the salt water activated battery 24. As can be seen in FIGS. 2 and 3, the battery is supported by means of webs 78 and 80 located adjacent the upper and lower ends of the battery, respectively, and extending between the sidewall of the chamber and the battery. Adjacent the lower end of chamber 77 there are provided a plurality of water inlet ports 84 horizontally spaced around the periphery of the housing to permit entry of water into chamber 77 to energize the sea water activated battery located therein. A plurality of water outlet ports 86 communicate with chamber 77 through the sidewall of the housing and are located around the upper portion of chamber 77 to permit exhaust of water from the chamber. The chamber 77, in which the sea water activated battery is positioned, is located at a distance upwardly in the housing from the chamber 70 in which the apparatus for measuring the velocity of acoustical waves is located. This is desirable since the battery ionizes the water and such a reaction, if occurring forward of the apparatus 22, might affect the electro-acoustical transducer making the measurements of the velocity of acoustical waves.

In the preferred form of practicing the invention, the inlet ports 84 and chamber 77 are designed such that the chamber fills with water at a rate to produce a delayed full voltage output of the sea water activated battery 24. The flooding of the chamber is designed to start the battery at half power, with full output being reached only after several seconds while the housing sinks through the water. By this arrangement, the battery will be activated to a sufficient degree to operate the system after the housing is at least a foot beneath the water, at which time the shipborne hydrophone begins receiving an acoustical signal indicative of the measurement of the velocity of acoustical waves. This delayed energization of the battery is desirable in order to operate the sonar transducer initially at less than full driving power to prevent cavitation and possible destruction of the transducer, which may result from insufficient coupling to the water against which the transducer is mounted to operate.

As can be seen in FIGS. 2 and 3, pressure switch 40 is supported by and fixed to web 80 in chamber 77. The pressure switch is positioned in the chamber communicating with the water to be actuated by the water at the predetermined pressure, in this example the pressure associated with a depth of 1500 feet of water.

The electronic circuitry including the fixed-frequency generator, the keyer, combiner and amplifying modulator and filter shown in FIG. 4 are located in a water-tight chassis 90 fixedly supported adjacent upper end 62 of the housing. The pressure switch and sea water battery are electrically connected (not shown) to the circuitry located in chassis 74 and chassis 90.

The sonar transducer electrically connected to the amplifying modulator and filter in chassis 90 is supported in upper end 62 of the housing (the sonar transducer not being specifically shown in FIG. 2). The sonar transducer is preferably an air back-loaded composite free-edge disk, back-supported at three points on a nodal circle. This arrangement produces an omnidirectional output in the upward direction through the water but with the maximum output at approximately 60 degrees from the vertical. In this manner adequate upward transmission of the signal for pickup by a stopped or moving ship is assured, but maximum output at the 60 degree angle is provided for use with ships making 10 or more knots headway.

As previously stated, the sonar transducer is preferably of a piezoelectric polycrystalline crystal of barium titanite and in one embodiment of the system may have dimensions of 0.6 inch thick and 3 inches in diameter. The sonar transducer is air back-loaded with the top side of the transducer communicating directly with the water. By this arrangement, maximum energy is transferred to the water. As previously stated, the flooding of chamber 77 by the water is controlled to start the system at half power for the first few seconds after the housing is submerged in the water.

After the housing 12 has descended into the water and the system contained therein has been activated, a continuous acoustical signal is transmitted from the sonar transducer to give continuous information as to the velocity of acoustical energy in the water and to provide a continuous fixed-frequency signal, which is transmitted as amplitude modulation of the signal indicative of the velocity of acoustical energy, for comparison and correction of the velocity of acoustical energy information for Doppler effect of the telemetered acoustical signal in traveling from the housing to the shipboard hydrophone. At the predetermined pressure of the sea water, the pressure switch is actuated closed providing momentary interruption of the output acoustical signal, thereby providing indication of the time-depth reference point at which the predetermined pressure occurs. After this interruption, continuous transmission of the acoustical signal is resumed to a depth in the water as great as 6000 feet from the surface thereof.

FIG. 5 shows the hydrophone 16 and receiver apparatus generally designated 18 which are used to pickup and convert the acoustical signal from housing 12 to desired information on board the ship. Many different systems may be provided for converting the received signal into its component parts to give the velocity of acoustical wave information and Doppler effect correction. The system described as follows is merely illustrative of one such system of recovering the information contained in the received signal. The system will be described in relation to the frequencies previously stated, which are illustrative of frequencies at which the system may be operated.

The hydrophone 16 may be a conventional directional hydrophone which is oriented to listen toward the rear of the ship in the direction of the sinking housing and to pickup the acoustical signal transmitter therefrom as illustrated in FIG. 1. The signal picked up by the hydrophone is supplied to a 22 kilocycle filter and preamplifier 100. The filter preferably has a 22 kilocycle passband and eliminates noise and other undesired frequencies outside the passband while passing the nominal 22 kilocycle frequency carrier and its 730-cycle sidebands, the filter preferably having about an 8 percent bandwidth. The preamplifier may be of a conventional transistorized type.

In the present instance, the output of the 22 kilocycle filter and preamplifier 100 is supplied in parallel to a limiter and 22 kilocycle discriminator 104, a detector 105 and a tape recorder 108. The limiter of the limiter and 22 kilocycle discriminator 104 is provided for limiting the amplitude of the 22 kilocycle signal to a fixed level above a predetermined minimum value. The 22 kilocycle discriminator may be a standard 22 kilocycle F.M. discriminator to covert the varying frequency 22 kilocycle signal to a varying direct current voltage which is proportional to the incoming frequency and independent of the amplitude of the incoming signal. The output of the limiter and discriminator 104 is supplied to a signal combiner 110, to be described hereinafter.

The detector 105 is provided to detect the modulation of the received signal and to re-derive the 730 cycle signal which was modulated on the carrier. The output of detector 105 is supplied to an amplifier and automatic gain control system 106. The amplifier amplifies the 730 cycle signal and the automatic gain control (AGC) system is employed to vary automatically the gain of the amplifier to maintain a constant average signal level. The AGC system may comprise a feedback arrangement of conventional form.

The output of the amplifier and AGC system 106 is supplied to a conventional 730 cycle bandpass filter, which is used to eliminate all undesired frequencies except the 730 cycle band of interest. Due to relative motion between the ship and the sinking housing a similar Doppler shift will occur in the frequencies of both the 730-cycle signal and the 22 kilocycle signal. The Doppler shift in the fixed-frequency 730 cycle signal will always be downward, since the housing will be moving away from the ship and normally the ship will be moving away from the place where the housing was dropped. Therefore, the source and receiver will be moving apart, causing a lowering in frequency of the received signal. Due to the lowering in received frequency the 730 cycle bandpass filter preferably has a center frequency of 725 cycles, for example, with a plus or minus 5 cycle bandpass.

A limiter and 730-cycle discriminator 114 receive the output signal from the bandpass filter 112. The limiter is employed to limit the amplitude of the 730-cycle signal to a fixed level above a predetermined minimum value. The 730-cycle discriminator may be a conventional type to convert the varying 730-cycle signal to a varying direct current voltage which is proportional to the difference between the incoming frequency and 730 c.p.s., i.e., the Doppler shift error, and independent of the amplitude of the incoming signal. The output of the limiter and discriminator 114 is supplied to the signal combiner 110 and provides the correction factor to the 22-kilocycle channel for error due to Doppler effect.

The signal combiner 110 is responsive to the signals from the limiter and 22-kilocycle discriminator 104 and the limiter and 730-cycle discriminator 114 to provide an output signal representative of the velocity of acoustical waves in water, corrected for Doppler shift. The signal combiner may be a conventional multiplier circuit with suitable calibration for combining the signals from the two limiter and discriminator circuits to cancel out the error in the signal of the 22 kilocycle channel. In this case the signal combiner, in effect, multiplies the signal of the 22 kilocycle channel containing the error due to Doppler shift by the inverse of the error provided by the signal of the 730 cycle channel, to cancel out the error in the received 22-kilocycle signal which contains the information as to the velocity of acoustical waves.

It will be appreciated that by the arrangement of the present invention which provides a continuous signal comprising a fixed-frequency signal and the velocity of acoustical wave signal from the housing, the correction of the velocity of acoustical wave signal can be accurately made for Doppler error. Since both signals, fixed-frequency and velocity of acoustical wave, are transmitted at the same time, as a single modulated signal, they travel the same path and are subjected to the same error due to Doppler effect. Thus, the known fixed-frequency signal provides an accurate indication of the correction factor needed for adjustment of the velocity of acoustical wave signal.

One form of an alternative circuit for performing the functions of the limiter and frequency discriminator 104 and the signal combiner 110 in the circuit of FIG. 5 is shown in FIG. 6. It is shown as comprising the series combination of a limiter 118, a monostable multivibrator 120, and a low-pass filter 122, together with a calibration network 124. The output of the limiter and 730-cycle discriminator 114 is supplied to a calibration network 124, which correlates the relationship of the error signal to the desired amount of correction attributable to each value of the error signal. Each cycle of the 22 kilocycle received signal triggers the multivibrator 120, the multivibrator then returning to its normal state after an interval shorter than the period of the 22 kilocycle signal but variable in response to the voltage supplied to it from calibration network 124. The monostable multivibrator therefore produces a series of rectangular output pulses which are passed through the low pass filter 122. The output of the latter filter varies in proportion to the repetition rate of the pulses and also in proportion to the width of the pulses. If an error is present, due to Doppler effect, the error signal from the calibration network supplied to the monostable multivibrator will vary the widths of the multivibrator pulses in a sense to cancel the error in the output signal of the filter due to Doppler shift in the 22 kilocycle signal. The Doppler effect, under the usual condition of use of the system, will decrease the frequency of the received 22 kilocycle signal, as previously stated, so that the calibration network signal is normally employed to increase the widths of the output pulses of the multivibrator, thereby increasing the output of the filter to the desired corrected value.

As can be seen in FIG. 5, the corrected signal representative of the velocity of acoustical waves from the signal combiner 110 is supplied to a conventional pen recorder 126 to record the direct current voltage level of the velocity of acoustical wave information on a time base graph. Also, the output of the amplifier and AGC system 106 is supplied to a low pass filter 128 which has its output connected to a channel of the pen recorder 126. The signal from the filter 128 is recorded on a time base graph and, when its level decreases to zero during the depth-indicating interruption, caused by the closure of the pressure switch 40, this occurrence is indicated on the recorder.

The tape recorder 108 is employed to give a permanent record of various of the signals from which the velocity of acoustical wave information may again be determined. As previously stated, the output of the 22-kilocycle filter and preamplifier 100 is supplied to the multitrack tape recorder on one track thereof and the output of the 730-cycle bandpass filter is recorded on a second track of the tape recorder. For reference purposes, a 100 kilocycle oscillator 127 is provided and its output signal recorded on a third track of the tape recorder to give a reference to which the speed of the recorder can be compared, since the recorder may not be operating at all times at a constant speed. The 100 kilocycle signal provides a correction factor which may be used to correct the other recorded signals for any variation in speed of the recorder.

With the information as to the velocity of acoustical waves versus depth in the water, the performance of a sonar system can be predicted, such as the effective range of the system and the range correction needed for error in the display of the system, due to the layer effect of the ocean. The present invention provides continuous information as to the velocity of acoustical waves in water, and continuous information as to Doppler effect for comparison and correction of the velocity of acoustical wave information. Moreover, it will be appreciated that the system of the present invention also provides the time-depth indication needed for the computation of the time-depth rate of descent of the housing, and the depth information is provided without substantial interruption of the other transmitted information. It will be appreciated that the transmitter equipment of the present invention is compact and inexpensive to manufacture and one which is designed to provide a stable and non-turbulent descent through the water to provide accurate data at desired depths beneath the surface of the water.

While the invention has been described with particular reference to a specific embodiment thereof, it will be understood that it may be embodied in a large variety of forms different from the one specifically shown and described without departing from the scope and spirit of the invention as defined by the appended claims.

We claim:

1. Apparatus for transmitting indications of velocity of acoustical waves in a medium comprising:
    means for measuring the velocity of acoustical waves in said medium and for producing a series of output signals at a frequency indicative of said velocity,
    a fixed-frequency signal generator having an output signal of a known frequency,
    an amplitude modulator responsive to said velocity-indicating output signals and said fixed-frequency output signal for modulating the amplitude of said velocity-indicating output signals at the rate of said fixed-frequency output signal to provide a modulated signal, and
    transducer means responsive to said modulated signal for transmitting said modulated signal into said medium as an acoustical signal, whereby said acoustical signal provides a continuous indication of the velocity of acoustical waves in said medium and provides a continuous fixed-frequency signal for comparison and correction of the velocity of acoustical wave information for Doppler effect of said acoustical signal in traveling to a receiver.

2. Apparatus in accordance with claim 1, further comprising pressure-sensitive means responsive to a predetermined pressure of said medium for triggering said apparatus to interrupt operation of said amplitude modulator to provide an indication of the time at which said predetermined pressure occurs.

3. Apparatus in accordance with claim 1, further comprising a pressure-sensitive switch actuatable to complete an electrical path at a predetermined pressure of said medium, and a keyer responsive to the completion of said electrical path for actuating said apparatus to momentarily interrupt transmission of said acoustical signal from said transducer means, thereby providing an indication of the time at which said predetermined pressure occurs.

4. Apparatus for transmitting indications of velocity of acoustical waves in a medium comprising:
    means for measuring the velocity of acoustical waves in said medium and for producing a series of output signals at a frequency indicative of said velocity,
    a direct-current battery for providing a direct-current voltage supplying electrical power.
    a fixed-frequency generator having an output signal of known frequency,
    a combiner responsive to said direct-current voltage and said fixed-frequency signal for combining said voltage and said fixed-frequency signal into a combined output signal,
    an amplifying modulator responsive to said combined output signal and said velocity-indicating output signals for amplifying and amplitude-modulating said velocity-indicating output signals with said fixed-frequency signal to produce an output amplitude-modulated signal, and
    transducer means responsive to said amplitude-modulated signal for transmitting said last-mentioned signal into said medium as an acoustical signal, whereby said acoustical signal provides a continuous indication of the velocity of acoustical waves in said medium and provides a continuous fixed-frequency signal for comparison and correction of the velocity of acoustical wave information for Doppler effect of said acoustical signal in traveling to a receiver.

5. Apparatus for transmitting indications of velocity of acoustical waves in water comprising:
    means for measuring the velocity of acoustical waves in said water and for producing a series of output signals at a frequency indicative of said velocity,
    a fixed-frequency signal generator having an output signal of a known frequency,
    an amplitude modulator responsive to said velocity-indicating output signals and said fixed-frequency output signal for modulating the amplitude of said velocity-indicating output signals at the rate of said fixed-frequency output signal to provide a modulated signal,
    a pressure-sensitive switch actuatable to complete an electrical path at a predetermined pressure of said water,
    a keyer responsive to the completion of said electrical path for producing at least one trigger pulse in response to actuation of said pressure-sensitive switch, said amplitude modulator being responsive to said at least one trigger pulse for momentarily interrupting operation of said amplitude modulator to provide an indication of the time at which said predetermined pressure occurs, and transducer means responsive to said modulated signal for transmitting said modulated signal into said water as an acoustical signal, whereby said acoustical signal having at least one interruption provides a substantially continuous indication of the velocity of acoustical waves in said water, provides a substantially continuous fixed-frequency signal for comparison and correction of the velocity of acoustical wave information for Doppler effect of said acoustical signal in traveling to a receiver and provides an indication of the time at which said predetermined pressure occurs.

6. Apparatus for transmitting indications of velocity of acoustical waves in water comprising:

means for measuring the velocity of acoustical waves in said water and for producing a series of output signals at a frequency indicative of said velocity, a direct-current battery for providing a direct-current voltage supplying electrical power, a fixed-frequency signal generator having an output signal of a known frequency, a combiner responsive to said direct-current voltage and said fixed-frequency output signal for combining said voltage and said fixed-frequency signal into a combined output signal, an amplifying modulator responsive to said combined output signal and to said velocity-indicating output signals for amplifying and amplitude-modulating said velocity-indicating output signals with said fixed-frequency signal to produce an output amplitude-modulated signal, a pressure-sensitive switch actuatable to complete an electrical path at a predetermined pressure of said water, a keyer responsive to the completion of said electrical path for providing at least one trigger pulse in response to actuation of said pressure-sensitive switch, said amplifying modulator being responsive to said at least one trigger pulse for momentarily interrupting operation of said amplifying modulator to provide an indication of the time at which said predetermined pressure occurs, and transducer means responsive to said amplitude-modulated signal for transmitting said last-mentioned signal into said water as an acoustical signal, whereby said acoustical signal having at least one interruption provides a substantially continuous indication of the velocity of acoustical waves in said water, provides a substantially continuous fixed-frequency signal for comparison and correction of the velocity of acoustical wave information for Doppler effect of said acoustical signal in traveling to a receiver and provides an indication of the time at which said predetermined pressure occurs.

7. Apparatus for transmitting indications of velocity of acoustical waves in water comprising:

a housing having a weighted and blunt-ended nose portion at one end and having a water inlet opening through said nose portion, said housing defining a chamber therein communicating with said water inlet opening and having a water outlet opening from said chamber, means for measuring the velocity of acoustical waves in said water in said chamber and for producing a series of output signals at a frequency indicative of said velocity, a fixed-frequency signal generator supported in said housing and having an output signal of a known frequency, an amplitude modulator supported in said housing responsive to said velocity-indicating output signals and said fixed-frequency output signal for modulating the amplitude of said velocity-indicating output signals at the rate of said fixed-frequency output signal to provide a modulated signal, and transducer means supported by said housing at its other end and being responsive to said modulated signal for transmitting said modulated signal into said water as an acoustical signal, whereby said acoustical signal provides a continuous indication of the velocity of acoustical waves in said water and provides a continuous fixed-frequency signal for comparison and correction of the velocity of acoustical wave information for Doppler effect of said acoustical signal in traveling to a receiver.

8. Apparatus for transmitting indications of the velocity of acoustical waves in water comprising:

a housing having a weighted and blunt-ended nose portion at one end and having a water inlet opening through said nose portion, said housing defining a chamber therein communicating with said water inlet opening and having a water outlet opening communicating with said chamber, a fin supported outside said housing adjacent its other end and being generally annular in form and surrounding a portion of said housing, said fin and said housing providing flow-through ports therebetween, means for measuring the velocity of acoustical waves in said water in said chamber and for producing a series of output signals at a frequency indicative of said velocity, a direct-current battery supported in said housing for providing a direct-current voltage supplying electrical power, a fixed-frequency signal generator supported in said housing and having an output signal of known frequency, a combiner supported in said housing and responsive to said direct-current voltage and said fixed-frequency signal for combining said voltage and said fixed-frequency signal into a combined output signal, an amplifying modulator supported in said housing responsive to said velocity-indicating output signals and to said combined output signal for amplifying and amplitude-modulating said velocity-indicating output signals with said fixed-frequency signal to produce an output amplitude-modulated signal, and transducer means supported by said housing at its other end and being responsive to said amplitude-modulated signal for transmitting said last-mentioned signal into said water as an acoustical signal, whereby said acoustical signal provides a continuous indication of the velocity of acoustical waves in said water and provides a continuous fixed-frequency signal for comparison and correction of the velocity of acoustical wave information for Doppler effect of said acoustical signal in traveling to a receiver.

9. Apparatus in accordance with claim 8 further comprising:

a pressure-sensitive switch supported by said housing and communicating with said water and actuatable to complete an electrical path at a predetermined pressure of said water, and a keyer supported in said housing and responsive to the completion of said electrical path for actuating said amplifying modulator to momentarily interrupt operation of said amplifying modulator, thereby interrupting said acoustical signal to provide an indication of the time at which said predetermined pressure occurs.

10. Apparatus for transmitting indications of velocity of acoustical waves in water comprising:

a generally cylindrical housing having a weighted and blunt-ended nose portion at one end and having a water inlet opening through said nose portion, said housing defining a first chamber communicating with said water inlet opening and having a water outlet opening communicating with said first chamber, said housing having a plurality of spaced inlet openings in a sidewall thereof and defining a second chamber communicating with said water inlet openings in said sidewall, said housing having a plurality of water outlet openings communicating with said second chamber, means for measuring the velocity of acoustical waves in said water in said first chamber and for producing a series of output signals at a frequency indicative of said velocity, a sea-water activated direct-current battery supported in said second chamber for providing a direct-current voltage supplying electrical power, a fixed-frequency signal generator supported in said housing and having an output signal of known frequency, a combiner supported in said housing and being responsive to said direct-current voltage and said fixed-frequency output signal for combining said voltage and said fixed-frequency signal into a combined output signal, an amplifying modulator supported in said housing responsive to said velocity-indicating output signals and said combined output signal for amplifying and amplitude-modulating said velocity-indicating output signals with said fixed-frequency signal to produce an output amplitude-modulated signal, and transducer means supported by said housing at its other end and responsive to said amplitude-modulated signal for transmitting said amplitude-modulated signal into said water as an acoustical signal, whereby said acoustical signal provides a continuous indication of the velocity of acoustical waves in said water and provides a continuous fixed-frequency signal for a comparison and correction of the velocity of acoustical wave information for Doppler effect of said acoustical signal in traveling to a receiver.

11. Apparatus in accordance with claim 10 further comprising a generally annular fin spaced from and surrounding a portion of said housing adjacent said other end and supported by a web fixed to said fin and said housing.

12. Receiver apparatus for receiving an acoustical signal transmitted from different depths in water, said signal comprising a carrier wave indicative of the velocity of acoustical waves in said water and amplitude modulated by a nominally fixed-frequency signal, said acoustical signal being subject to Doppler shift in frequency, said apparatus comprising:

electro-acoustical transducer means for receiving said acoustical signal and for converting said acoustical signal to an electrical signal;

means for detecting said fixed-frequency modulation of said electrical signal and for providing an output signal representative of said fixed-frequency;

first frequency discriminator means responsive to said fixed-frequency output signal for producing an output voltage related to changes in frequency of said fixed-frequency signal due to Doppler effect in said acoustical signal traveling through said water to said receiver;

second frequency discriminator means responsive to said carrier wave component of said electrical signal for producing an output voltage varying in accordance with changes in the frequency of said carrier wave;

means for modifying said output of said second discriminator in accordance with said output of said first discriminator to correct said output voltage of said second discriminator for Doppler error introduced in said acoustical signal.

13. The receiver apparatus in accordance with claim 12, in which said received acoustical signal contains at least one interruption indicative of a predetemined depth from which said acoustical signal is transmitted, said receiver apparatus further comprising means for detecting the absence of said electrical signal due to said interruption and for producing an output indicative of the time of occurrence of said interruption.

14. Receiver apparatus for receiving an acoustical signal transmitted from different depths in water, said signal comprising a carrier wave indicative of the velocity of acoustical waves in said water and amplitude modulated by a nominally fixed-frequency signal, said acoustical signal being subject to Doppler shift in frequency, said apparatus comprising:

electro-acoustical transducer means for receiving said acoustical signal and for converting said acoustical signal to an electrical signal, means for detecting said fixed-frequency modulator of said electrical signal and for providing an output signal representative of said fixed-frequency, means responsive to said fixed-frequency output signal for passing said fixed frequency signal and eliminating all undesired frequencies to provide an output signal representative of said fixed-frequency, first frequency discriminator means responsive to said last-mentioned fixed-frequency output signal for producing an output voltage related to changes in frequency of said fixed-frequency signal due to Doppler effect in said acoustical signal traveling through said water to said receiver, second frequency discriminator means resonsive to said carrier wave component of said electrical signal for producing an output voltage varying in accordance with changes in the frequency of said carrier wave, and means for modifying said output of said second discriminator in accordance with said output of said first discriminator to correct said output voltage of said second discriminator for Doppler error introduced in said acoustical signal.

15. Receiver apparatus for receiving an acoustical signal transmitted from different depths in water, said signal comprising a carrier wave indicative of the velocity of acoustical waves in said water and amplitude modulated by a nominally fixed-frequency signal, said acoustical signal being subject to Doppler shift in frequency, said apparatus comprising:

electro-acoustical transducer means for receiving said acoustical signal and for converting said acoustical signal to an electrical signal, means for detecting said fixed-frequency modulation of said electrical signal and for providing an output signal representative of said fixed-frequency, first frequency discriminator means responsive to said fixed-frequency output signal for producing an output voltage related to changes in frequency of said fixed-frequency signal due to Doppler effect in said acoustical signal traveling through said water to said receiver, second frequency discriminator means responsive to said carrier wave component of said electrical signal for producing an output voltage varying in accordance with changes in the frequency of said carrier wave, and means responsive to said output voltage from said first frequency discriminator and to said output voltage from said second frequency discriminator for producing an output voltage representative of said velocity of acoustical waves in water corrected for Doppler error introduced in said acoustical signal.

16. Receiver apparatus for receiving an acoustical signal transmitted from different depths in water, said signal comprising a carrier wave indicative of the velocity of acoustical waves in said water and amplitude modulated by a nominally fixed-frequency signal, said acoustical signal being subject to Doppler shift in frequency, said apparatus comprising:

electro-acoustical transducer means for receiving said acoustical signal and for converting said acoustical signal to an electrical signal;

means for detecting said fixed-frequency modulation of said electrical signal and for providing an output signal representative of said fixed frequency;

frequency discriminator means responsive to said fixed-frequency output signal for producing an output voltage related to changes in frequency of said fixed-frequency signal due to Doppler effect in said acoustical signal traveling through said water to said receiver;

a monostable multivibrator responsive to said carrier wave component of said electrical signal for producing a series of output pulses in accordance with the frequency of said carrier wave, each cycle of said carrier wave actuating said multivibrator to produce an output pulse; and means for modifying said output pulses of said multivibrator in accordance with said output of said discriminator to correct said output pulses of said multivibrator for Doppler shift introduced in said acoustical signal, whereby said corrected output pulses of said multivibrator provide an indication of said velocity of acoustical waves in said water.

17. A telemetering system for providing indications of velocity of acoustical waves at a remote point in a medium, comprising:

means for measuring the velocity of acoustical waves in said medium;

means for generating a first electrical signal having a frequency which varies in accordance with said velocity of acoustical waves in said medium;

means for generating a second electrical signal of a predetermined fixed-frequency;

means for amplitude-modulating said first signal with said second signal to produce an amplitude-modulated electrical carrier-wave signal;

an electro-acoustical transducer supplied with said amplitude-modulated carrier-wave signal for transmitting an acoustical signal corresponding thereto, electro-acoustical transducer means for receiving said acoustical signal and for converting said acoustical signal to an electrical signal, means for detecting said fixed-frequency modulation of said electrical signal and for providing an output signal representative of said fixed-frequency, first frequency discriminator means responsive to said output signal representative of said fixed-frequency for producing an output voltage related to changes in frequency of said fixed-frequency signal due to Doppler effect in said acoustical signal traveling through said medium, second frequency discriminator means responsive to said velocity-indicating signal component of said electrical signal for producing an output voltage varying in accordance with changes in the frequency of said velocity-indicating signal, and means for modifying said output of said second discriminator in accordance with said output of said first discriminator to correct said output voltage of said second discriminator for Doppler error introduced in said acoustical signal.

18. The telemetering system in accordance with claim 17 further comprising means for producing an interruption of said amplitude-modulated electrical carrier-wave signal from said means for amplitude-modulating thereby providing an indication of the time at which a predetermined pressure in said medium is reached by said means for measuring, and means responsive to said electrical signal from said transducer means for detecting the absence of said electrical signal due to said interruption and for producing an output indicative of the time at which said predetermined pressure occurs.

References Cited
UNITED STATES PATENTS
3,133,261    5/1964    Ott _____ 340—5

RODNEY D. BENNETT, *Primary Examiner.*

RICHARD A. FARLEY, *Examiner.*